US009100138B2

United States Patent
Xia et al.

(10) Patent No.: US 9,100,138 B2
(45) Date of Patent: Aug. 4, 2015

(54) METHOD AND SYSTEM FOR AUTOMATIC TOPOLOGY DISCOVERY IN WAVELENGTH DIVISION MULTIPLEXING (WDM) NETWORK

(71) Applicant: Telefonaktiebolaget L M Ericsson (publ), Stockholm (SE)

(72) Inventors: Ming Xia, Milpitas, CA (US); Björn Skubic, Hässelby (SE); Stefan Dahlfort, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 120 days.

(21) Appl. No.: 14/053,527

(22) Filed: Oct. 14, 2013

(65) Prior Publication Data
US 2015/0104170 A1 Apr. 16, 2015

(51) Int. Cl.
*H04B 10/08* (2006.01)
*H04J 14/02* (2006.01)
(Continued)

(52) U.S. Cl.
CPC ......... *H04J 14/0227* (2013.01); *H04J 14/0202* (2013.01); *H04L 41/12* (2013.01); *H04Q 11/0005* (2013.01); *H04Q 2011/0037* (2013.01); *H04Q 2011/0052* (2013.01)

(58) Field of Classification Search
CPC ............. H04B 10/073; H04B 10/0775; H04B 10/0779; H04B 10/0795
IPC ....................... H04B 10/073, 10/0775
See application file for complete search history.

(56) References Cited

U.S. PATENT DOCUMENTS

| 2003/0058496 A1 | 3/2003 | Obeda et al. |
| 2004/0008988 A1* | 1/2004 | Gerstal et al. ............ 398/45 |
| 2005/0047350 A1 | 3/2005 | Kantor et al. |

(Continued)

FOREIGN PATENT DOCUMENTS

WO WO-2007/050222 A2 5/2007

OTHER PUBLICATIONS

Chi, et al., "Automatic neighbor discovery protocol for optical networks", Proceedings of SPIE, vol. 4584, Nov. 13, 2001, pp. 194-201.
(Continued)

*Primary Examiner* — Dzung Tran
(74) *Attorney, Agent, or Firm* — Nicholson De Vos Webster & Elliott LLP

(57) ABSTRACT

A method for automatic topology discovery implemented in a wavelength division multiplexing (WDM) network is disclosed. The WDM network contains a number of wavelength switching devices, and the method starts with selecting an unassigned wavelength between a pair of wavelength switching devices. For a first port of a first wavelength switching device, a pass through state is configured between the first port and a coupling port of the first wavelength switching device, and a first probing signal is sent at the unassigned wavelength to the first wavelength switching device. The method continues with detecting iteratively the first probing signal at the unassigned wavelength through each of a set of ports of a second wavelength switching device during a time period, and recording a connection between the first port of the first wavelength switching device and a port of the second wavelength switching devices when the first probing signal is detected.

22 Claims, 7 Drawing Sheets

(51) Int. Cl.
*H04L 12/24* (2006.01)
*H04Q 11/00* (2006.01)

(56) References Cited

U.S. PATENT DOCUMENTS

| | | | |
|---|---|---|---|
| 2005/0089027 A1* | 4/2005 | Colton | 370/380 |
| 2010/0283996 A1* | 11/2010 | Wan et al. | 356/73.1 |
| 2011/0262142 A1* | 10/2011 | Archambault | 398/83 |
| 2013/0121686 A1* | 5/2013 | Voigt et al. | 398/19 |
| 2013/0236169 A1* | 9/2013 | Gaudette et al. | 398/25 |
| 2013/0243416 A1 | 9/2013 | Dahlfort et al. | |
| 2014/0016926 A1* | 1/2014 | Soto et al. | 398/16 |

OTHER PUBLICATIONS

Stefan Dahlfort et al., "Method for Quick Automatic Remote Wavelength Discovery and Configuration," U.S. Appl. No. 13/974,898, filed Aug. 23, 2013, 41 pages.

Stefan Dahlfort et al., "Resilience in an Access Subnetwork Ring," U.S. Appl. No. 13/484,115, filed May 30, 2012, 43 pages.

Stefan Dahlfort et al., "Service Edge Hug Device and Methods in an Optical Network Node," U.S. Appl. No. 13/651,877, filed Oct. 15, 2012, 35 pages.

* cited by examiner

METHOD AND SYSTEM FOR AUTOMATIC TOPOLOGY DISCOVERY IN WAVELENGTH DIVISION MULTIPLEXING (WDM) NETWORK

FIELD OF INVENTION

The embodiments of the invention are related to the field of networking. More specifically, the embodiments of the invention relate to a method and system for automatic topology discovery in a wavelength division multiplexing (WDM) network.

BACKGROUND

Wavelength division multiplexing (WDM) is a technology multiplexing a number of optical carriers over a single optical fiber by using different wavelengths. The technique enables bidirectional communications over one strand of fiber as well as multiplication of capacity. Through WDM, an optical communication network can be formed to deliver high capacity and high availability communication for today's ever increasing bandwidth intense applications.

One central advantage of a WDM centric solution is simplification through elimination of optical/electronic (O/E) conversion. A WDM network may utilize wavelength switches (WSSes) and optical add drop modules (OADMs), which can be either fixed or mini reconfigurable OADMs (ROADMs) for networking, for example, through network architecture disclosed in U.S. patent application Ser. No. 13/420,416, entitled "Optical Network Architecture for Transporting WDM traffic," U.S. patent application Ser. No. 13/484,115, entitled "Resilience in an Access Subnetwork Ring," U.S. patent application Ser. No. 13/651,877, entitled "Service Edge Hub Device and Methods in an Optical Network Node," dated Mar. 14, 2012, May 30, 2012, and Oct. 15, 2012 respectively, incorporated by reference herein. Comparing to conventional packet aggregation networks, network intelligence is decoupled from the network device carrying traffic and transferred to the boundaries of segment (e.g., to the lambda controller, discovery unit, and smart optical interfaces).

For the WDM centric solution to work, however, the boundaries of segment need to know detail network topology information to perform wavelength routing. The process of discovering the network topology is fundamental for network control and management. One example concerns the protection process where network topology is needed to identify the shared risk group (SRG) and to isolate network failures.

The network topology information can be obtained in network planning process. Yet, network topology of a WDM network changes during operations due to various reasons, such as network device/fiber failures.

Topology information required for network control and management consists of network devices and fiber connectivity between the network devices including port information. As an example, this means that the port number of a wavelength selective switch (WSS) that connects a fiber access ring must be known. Depending on the level of detail of the planning information, topology discovery can be used to verify or discover remote network elements and port information.

Known existing schemes for topology discovery are on the packet level and include:

SNMP discovery—The SNMP manager software (present in a discovery tool), queries the SNMP-enabled devices in the network. Based on these SNMP queries and replies, the manager then builds up the network map, complete with details on device location.

Active probes—In this approach, the discovery tool sends out light-weight "probe" packets through the network. The probe scans the network, and transmits device-related data back to the discovery module.

Yet, these conventional packet based approaches for topology discovery above are not directly applicable to WDM networks, since these approaches require software/hardware complexity at the network devices, so that the network devices can either passively respond to the queries made by the network control node, or actively report their existence to the network controller. These approaches also require proprietary mechanisms or standard network protocols (SNMP, IP, etc.) to be understood to achieve the full set of functionalities. For example, SNMP discovery requires that network devices have SNMP capabilities, which could be prohibitively expensive if equipped for every OADM. But more importantly, WDM networks is generally a layer-1 architecture that provides wavelength transport services between the clients and the network service equipment, which is transparent to upper layer protocols for complex network functions. Therefore, a discovery process for WDM networks should be performed on the wavelength level, and cannot rely on packet-level support.

In a WDM network, the network devices such as WSSes and OADMs have limited capabilities of providing local information relevant for building the topology map. The passive elements such as OADMs The passive elements such as OADMs are unable to either report their existence or respond to inquiries from higher-level network elements. For active elements such as WSSes or mini-ROADMs there will be operations, administration, and management (OAM) connectivity with the lambda controller for control purposes. However, limited information can be extracted from these network elements for topology mapping purposes.

Thus, it is desirable to discover WDM network topology automatically without solely depends on static network topology information obtained in network planning process or packet based topology discovery.

SUMMARY

A method for automatic topology discovery implemented in a wavelength division multiplexing (WDM) network is disclosed. The WDM network contains a number of wavelength switching devices, and the method starts with selecting an unassigned wavelength between a pair of wavelength switching devices of the number of wavelength switching devices. For a first port of a first wavelength switching device of the pair of wavelength switching devices, a pass through state is configured between the first port and a coupling port of the first wavelength switching device, where the coupling port coupled to a control node aggregating traffic of the first wavelength switching device, and a first probing signal is sent at the unassigned wavelength to the first wavelength switching device. In addition, for the first port of the first wavelength switching device, the method continues with detecting iteratively the first probing signal at the unassigned wavelength through each of a set of ports of a second wavelength switching device of the pair of wavelength switching devices during a first time period, where a pass through state is configured iteratively between each port of the set of ports of the second wavelength switching device and a coupling port of the second wavelength switching device, and recording a connection between the first port of the first wavelength switching device and a port of the second wavelength switching device when the first probing signal is detected at the unassigned wavelength at the port of the second wavelength switching device.

A network device for automatic topology discovery of a wavelength division multiplexing (WDM) network is disclosed. The WDM network contains a number of wavelength switching devices, and the network device comprises a controller and a discovery unit (DiU). The controller includes a control path interface configured to configure ports of the plurality of wavelength switching devices; a connection database configured to record connections based on a recording request; a probing signal selector configured to select an unassigned wavelength between a pair of wavelength switching devices of the plurality of wavelength switching devices; and a pass through provisioner configured to, for a first port of a first wavelength switching device of the pair of wavelength switching devices, initiate configuring a pass through state between the first port and a coupling port of the first wavelength switching device, where the coupling port coupled to a control node aggregating traffic of the first wavelength switching device. The DiU is coupled to the controller, and it includes a data path interface configured to send and detect probing signals as requested; a probing signal initiator configured to initiate sending a first probing signal at the unassigned wavelength to the first wavelength switching device; and a probing signal detector configured to initiate iteratively detecting the first probing signal at the unassigned wavelength through each of a set of ports of a second wavelength switching device of the pair of wavelength switching devices during a first time period, where a pass through state is configured iteratively between each port of the set of ports of the second wavelength switching device and a coupling port of the second wavelength switching device, and send out the recording request to record a connection between the first port of the first wavelength switching device and a port of the second wavelength switching device when the first probing signal is detected at the unassigned wavelength through the port of the second wavelength switching device.

The advantages of embodiments of the invention include automatically discovering WDM network topology without solely depends on static network topology information obtained in network planning process or packet based topology discovery.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
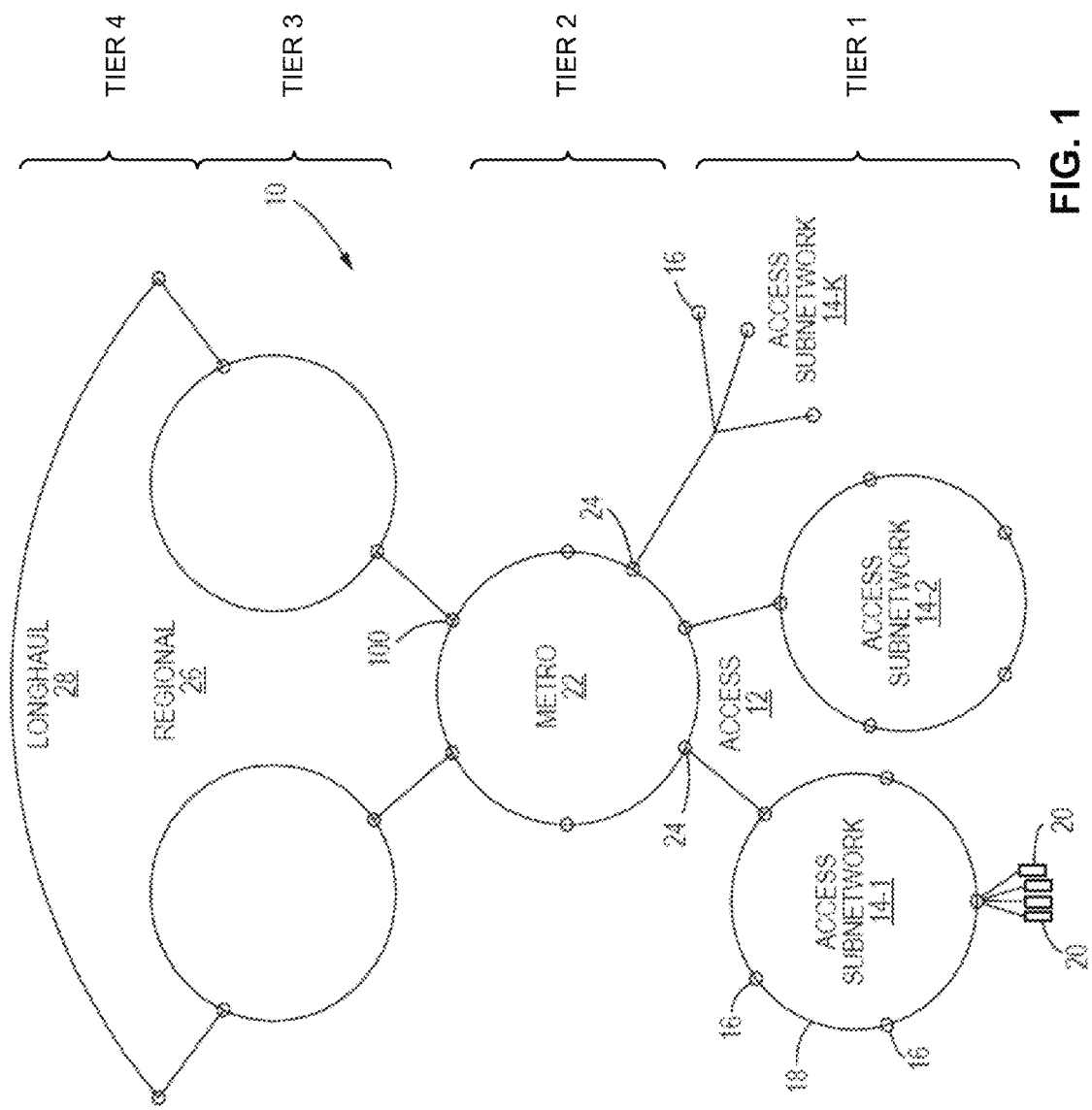
FIG. 1 illustrates a generic tiered architecture for optical transport networks configured to transport wavelength division multiplexing (WDM) traffic according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, a switch, or a controller) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards.

A network interface may be physical or virtual. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface).

WDM Network Configuration

FIG. 1 illustrates a generic tiered architecture for optical transport networks configured to transport wavelength division multiplexing (WDM) traffic according to one embodiment of the invention. A WDM network is commonly implemented with dense wavelength division multiplexing (DWDM) optics, and referred to as a DWDM network. Within the tiered architecture 10, the lowest tier shown, tier 1, includes a plurality of access networks that are each formed from a plurality of access network 12 comprising a plurality of access sub-networks 14-1, 14-2, . . . , 14-K. Each access sub-network 14-N is formed from multiple access sub-network node 16 interconnected via optical fiber 18 in a ring structure, a tree structure, a bus structure, a mesh structure, or any combination thereof.

In general, each access sub-network node 16 communicatively coupled to one or more client nodes 20, such as a remote radio unit, a base station, and a wireless access point. Deployed at each client node 20 are one or more optical modules that provide one or more optical ports. In some embodiment, an optical port module is a hot-pluggable or hot-swappable module that is deployed at a client node 20 by being physically plugged into that client node 20. Examples of such a pluggable/swappable module include a small form-factor pluggable (SFP) transceiver module, an XFP transceiver module, etc.

Communicatively coupled to one or more of the client nodes 20, an access sub-network node 16 aggregates the wavelength channels on which those client nodes 20 transmit uplink traffic and places the aggregated wavelength channels onto the access sub-network 14-N it forms. Similarly, the access sub-network node 16 drops from the access sub-network 14-N the wavelength channels on which downlink traffic is transmitted to client nodes 20.

The access network 12 in turn aggregates uplink WDM traffic from the network and places that aggregated traffic onto a higher-tiered network; namely, a metro network at tier 2. The metro network is formed from a plurality of interconnected peer network nodes 24, also referred to as central offices (COs), and transports WDM traffic for the plurality of access networks. In this regard, each peer network node 24 aggregates WDM traffic from one or more access networks to which it is connected and transports that aggregated traffic to a hub node 100 in the metro network.

The hub node 100 in turn routes wavelength channels from one or more COs 24 to a higher-tiered network called the regional network 26. More specifically, the hub node 100 routes wavelength channels to an appropriate one of multiple service-side nodes (not shown), e.g., a business services edge router, a residential services or mobile services broadband network gateway (BNG), a broadband remote access server (BRAS), etc. The service-side node then routes uplink traffic from the wavelength channels (typically at the packet level) towards an appropriate destination, such as to content servicers, back towards the access networks, to the Internet, etc. Such service side node routing may entail sending the uplink traffic to the regional network, which operates back at the optical layer. Thus, although omitted from FIG. 1 for simplicity of illustration, the hub node 100 connects to multiple service-side nodes and the service side nodes in turn connect to the regional transport network 26.

The regional network 26 is also formed from a plurality of interconnected peer network nodes, which place the uplink traffic onto a long haul network 28 at tier 4, for inter-regional transport. Downlink traffic propagates through the networks in an analogous, but opposite, manner.

Figure 2:
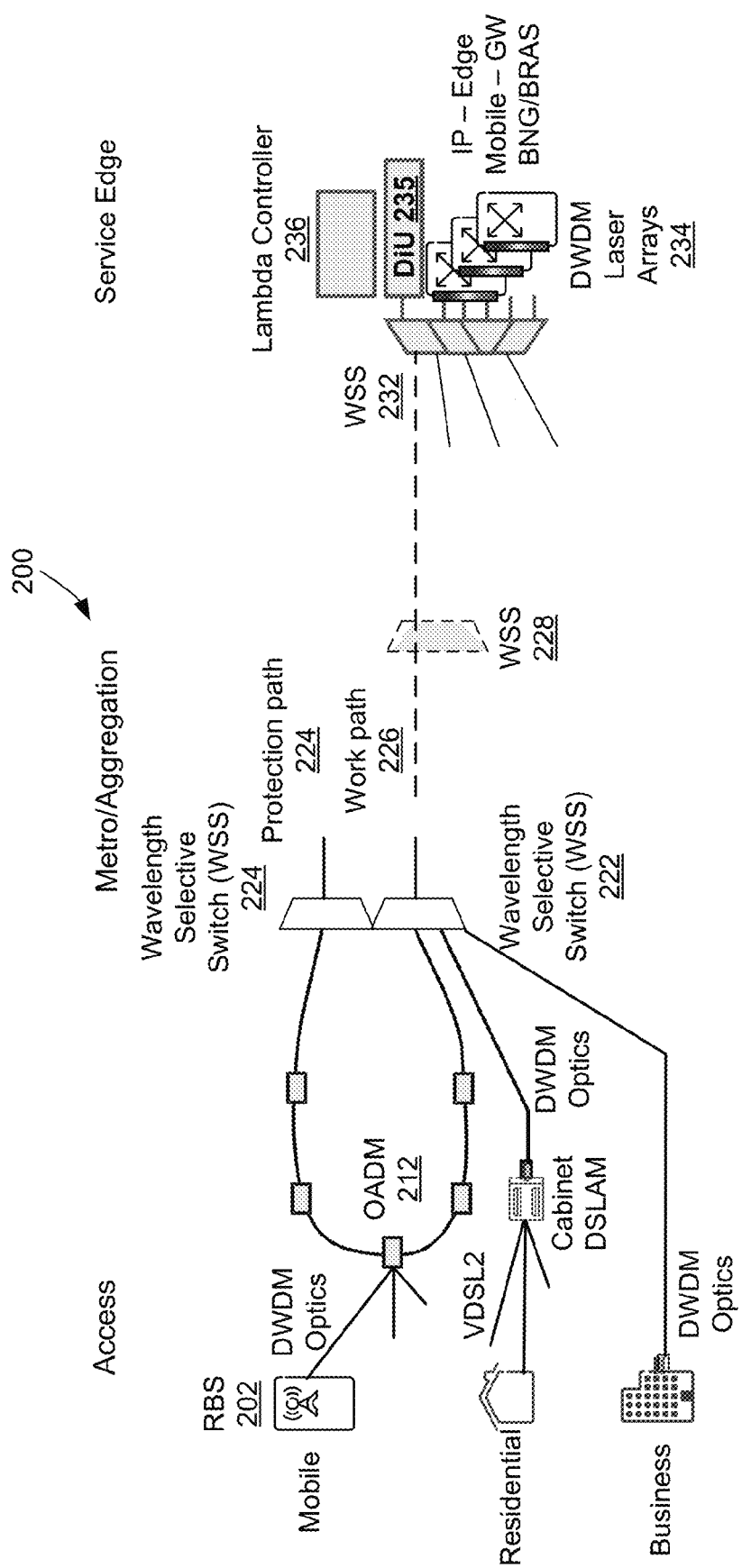
FIG. 2 illustrates a portion of an optical transport network according to one embodiment of the invention.

FIG. 2 illustrates a portion of an optical transport network according to one embodiment of the invention. The optical transport network 200 has several client nodes at access tier. The mobile client node is a remote radio unit (RBS) 200, which couples through dense wavelength division multiplexing (DWDM) optics to optical add drop module (OADM) 212. The OADMs can be either reconfigurable or fixed. If reconfigurable, they may be reconfigurable either only locally or also remotely, which requires a control channel to the network device. In one embodiment, in order to minimize the cost of the large volume of OADMs, the OADMs are only locally reconfigurable with limited intelligence at the OADMs (i.e., reconfiguration done at installation). These OADMs do not support communications with other network devices, for example, remote control by the control node, or response to inquiries from other network device. As OADMs are considered "dumb" in the network, their existence and locations cannot be discovered in a simple manner at the wavelength layer.

A number of OADMs form a ring and couple to wavelength selective switch (WSS) 222 and WSS 224. In addition, a residential node couples to a cabinet digital subscriber line access multiplexer (DSLAM), which in turn connects to WSS 222 through DWDM optics. Furthermore, a business node couples to WSS 222 directly through DWDM optics.

WSS 222 and WSS 224 protect each other, and one acts working WSS at a given moment and forms work path 226, and the other acts as protecting WSS. The role of WSSes 222 and 224 may be dynamically updated based on network condition. The traffic at access tier is aggregated at metro and aggregation tier and it may go through one or more WSS such as WSS 228 and route to service edge and received at WSS 232.

WSS 232 at service edge enable flexible service provisioning. Operations, administration, and management (OAM) connectivity between the WSSes and the control node may be provided out-of-band over the fiber infrastructure. Service edge contains lambda controller 236 configured to control wavelength routing/switching. Discovery unit (DiU) 235 is configured to discover network topology, and DWDM laser arrays 234 switches/routes traffic aggregated from various client nodes under the control of Lambda controller 236 to various networks through network devices such as IP edge, mobile gateway (GW), and broadband network gateway (BNG)/broadband remote access server (BRAS).

Note optical transport network 200 is but one embodiment of a tiered architecture for optical transport networks, and embodiments of the invention may be utilized in other optical transport networks, such as ones without protection pair of WSS, or flat architecture without multiple tiers.

Embodiment of WSS Topology Discovery

One way to automatically discover topology in a WDM network is through signal probing. A probing wavelength signal can be sent from a control node to a remote network device such as WSS or OADM. The wavelength then looped back by loop connections at the remote equipment and detected at a control node receiver. The idea can be used for several purposes. It can be used for detecting/verifying the presence of network devices where loop backs could be inserted as part of the installation procedure. It could also be used for detecting/verifying port connectivity between different network devices. Signal probing can be used in a tiered network such as the one illustrated in FIG. 1 and FIG. 2, but it can be expended to WDM networks utilizing flat architecture too.

In principle, it is possible to use the client interfaces of attached clients (assuming smart optics with OAM connectivity to the control node) to generate and detect probing signals. However, client interfaces will not be attached to all ports on day one. Furthermore, as OAM connectivity between the client interfaces and the control node is assumed to be handled indirectly via service edge optics (and in-band communication between the client and service edge interfaces), this assumes that a fairly detailed topology view already exists in the control node in order to set up the OAM connectivity to the client interfaces. For this reason, in one embodiment, it is assumed that we generally cannot rely on client interfaces for the topology discovery process although if available they could participate in a topology verification process.

Figure 3:
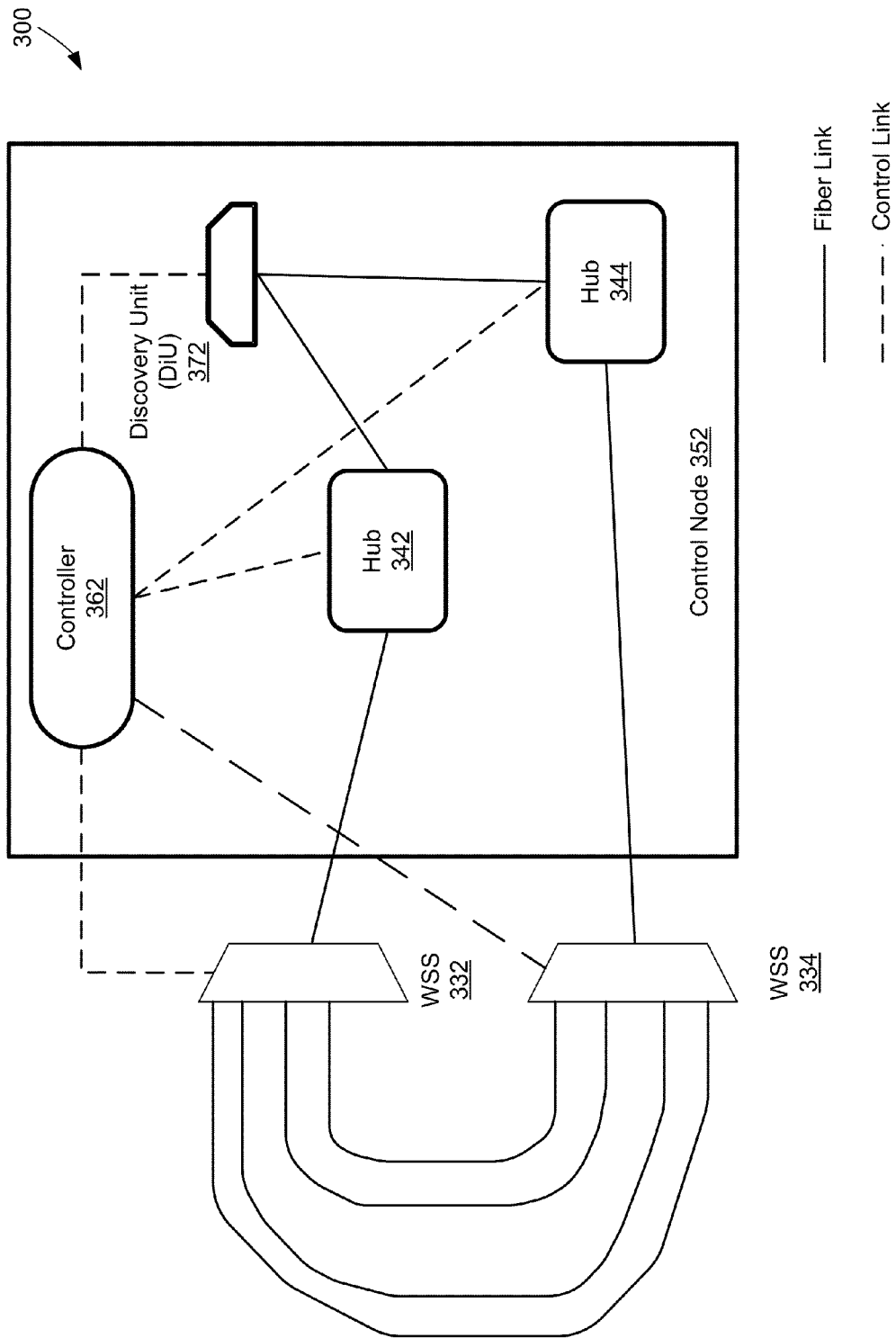
FIG. 3 illustrates WSS topology discovery according to one embodiment of the invention.

FIG. 3 illustrates WSS topology discovery according to one embodiment of the invention. The discovery is initiated and performed by control node 352 that includes both software intelligence and hardware components such as discovery unit (DiU) with transceivers. The process does not rely on local intelligence of WSS.

For WSS topology discovery, a probing wavelength signal is send from control node 352 (initiated from DiU 372 in one embodiment) to a remote network device, WSS 332 or WSS 334. The wavelength is looped back at the remote network devices and detected at the receiving end of control node 352. The receiving end does not need to decode the signal for determining connectivity but merely detect the presence of the signal, which relaxes optical signal noise ratio (OSNR) requirements.

WSSes 332 and 334 may connect between central offices (COs) and hubs, thus they are a part of connection of a backbone topology. WSSes 332 and 334 may also connect within COs or between different COs, which makes them a part of connection of a metro topology. FIG. 3 illustrates an embodiment of the invention where WSSes 332 and 334 are within a CO. Control node 352 contains two hubs, hubs 342 and 344, which connect to WSSes 332 and 334 respectively. WSSes 332 and 334 may protect each other, and the port connectivity between the WSSes is unknown. Controller 362 has control link connectivity with WSSes 332 and 334, hubs 342 and 344, and DiU 372. The control link may be used for transmitting and receiving OAM commands. There are fiber links between DiU and Hubs, hubs and WSSes as illustrated in FIG. 3 as an example.

The process may start with selecting a wavelength that has not been planned for the pair of WSSes. That is, controller 362 selects a wavelength outside of the assigned wavelength for WSSes 332 and 334. Then starting from one port of WSS 332, where the port is not the common port connecting to hub 342 (often referred to as "tributary port"), controller 362 provisions a pass through state between the port and the common port connecting to hub 342. Then controller 362 dictates DiU 372 to send a probing signal at the selected unassigned wavelength to hub 342 thus the probing signal passes through WSS 332 to the port provisioned at the pass through state.

Then DiU scans through all ports of WSS 334 excluding the common port connecting to hub 344 (tributary ports of WSS 334). For each port, a pass through state is configured between the port and the common port of WSS 334. DiU waits until a time threshold expires to detect a return signal of the probing signal. In one embodiment, the time threshold is determined based on maximum round trip time for the probing signal. If the probing signal is received within the time threshold, controller 362 records a connection between the selected port of WSS 332 and the port of WSS 334, from which the probing signal is detected. After all the ports are scanned through for the selected port of WSS 332, the port's connectivity with one or more ports of WSS 334 is recorded.

Then controller select another port of WSS 332 to provision a pass through state between the new port and the common port connecting to hub 342. The sending and detecting probing signal process is repeated to find the WSS 332 port's connectivity with one or more ports of WSS 334. Once the process is completed for all ports of WSS 332, the connectivity of all WSS 332 ports to WSS 334 ports is determined and the process completes between the pair of WSSes 332 and 334.

While not shown in FIG. 3, WSSes such as WSSes 332 and 334 at metro and aggregation tier are often coupled to OADMs as WSSes 222 and 224 shown in FIG. 2. As explained in more details herein, WSS port connectivity discovery can be used prior to OADM detection in a WDM network for topology discovery.

In one embodiment, control node 352 contains multiple DiUs, and these DiUs can be utilized in parallel to discover WSS port connectivity. In order to differentiate probing signals from different DiUs, a unique ID can be assigned to each probing signal, and the probing signal can be identified by writing an ID in the payload of an Ethernet frame (or a frame of a different protocol) or by an Ethernet MAC address. This imposes a requirement on decoding the received signal, which may require the round-trip transmission distance between DiU and the WSSes and OADMs be small enough.

Note the process of topology discovery can be utilized for any given pair of WSSes, and while two hubs are illustrated in the particular application, more or less hubs may be utilized in a different embodiment. For example, in an embodiment of the invention, WSS backbone connectivity is discovered through the probing signal sent through an unassigned wavelength. In this embodiment, the DiU may send and detect the probing signal from WSSes without going through hubs.

Also note that controller needs to be able to reach WSSes through control link to set ports to a pass through state. That is, WSSes in a WDM network are assumed to have OAM connectivity to the control node 352, directly or indirectly, and the OAM channel verifies existence of the WSSes and asserts control through provisioning commands. The OAM channel may be implemented in various protocols known to the persons skilled in the art.

While FIG. 3 illustrates WDM topology discovery for WSS port connectivity, the invention is not so limited. Wavelength loopback can be utilized to discover port connectivity between other wavelength switching devices using method similar to what is illustrated in FIG. 3. In other words, embodiments of the invention may be utilized for wavelength switching devices other than WSSes.

Figure 4:
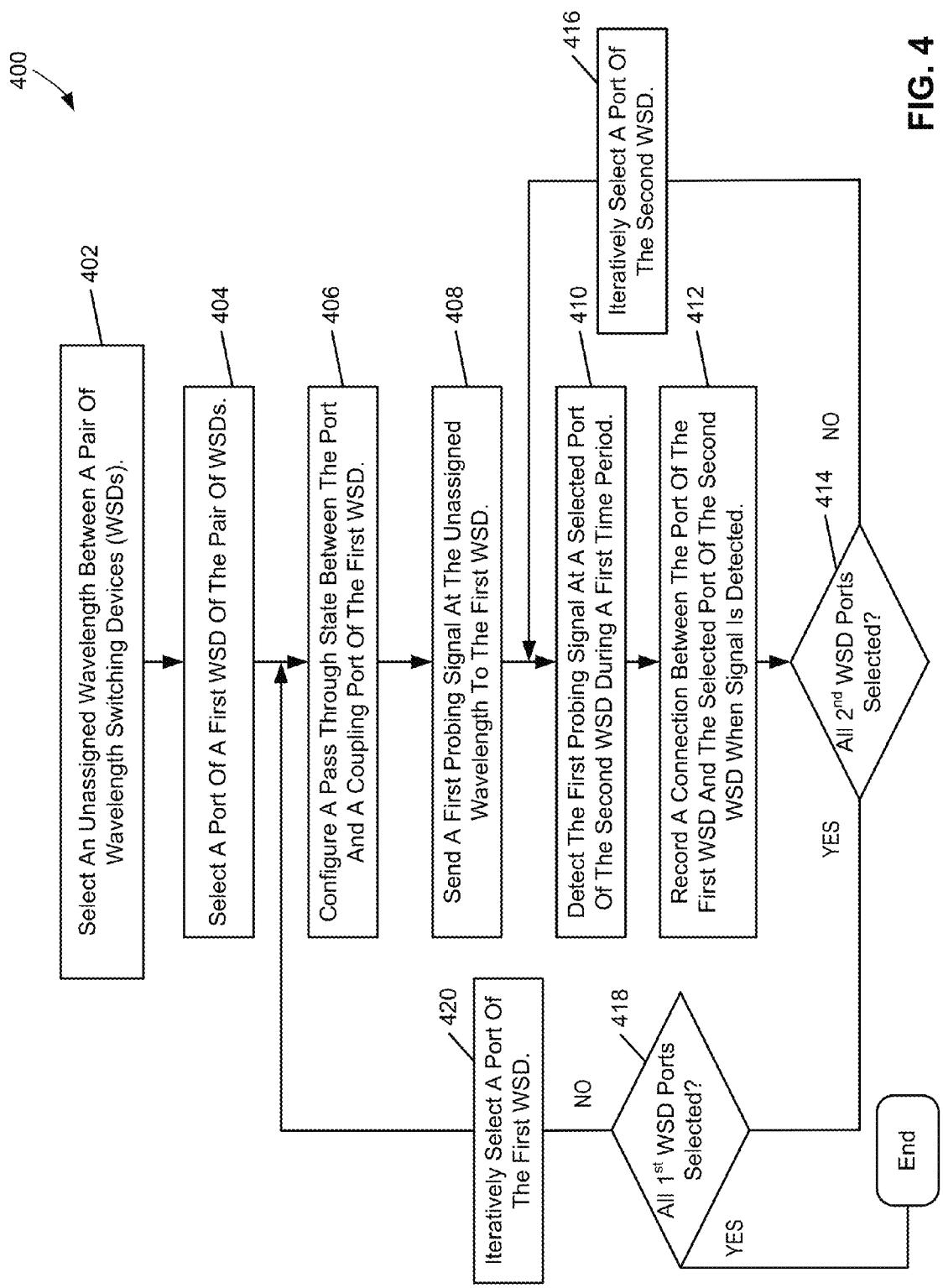
FIG. 4 is a flow diagram illustrating topology discovery of wavelength switching devices according to one embodiment of the invention.

FIG. 4 is a flow diagram illustrating topology discovery of wavelength switching devices according to one embodiment of the invention. Method 400 can be implemented at a control node and it is for finding port connectivity between a given pair of wavelength switching devices. A wavelength switching device can be any M×N wavelength switch, where M and N denote the numbers of input and output ports respectively, and both M and N≥1. WSS is generally considered as a 1×N wavelength switching device as it contains one common port and N tributary ports. A number of WSS may also work together forming a M×N wavelength switch.

For WSS, the method can be applies to discovery WSS port connectivity between a hub WSS and a CO WSS (for example, at hub node 100 of FIG. 1), between a pair of WSSes within a CO (for example, the protection pair of WSSes 222 and 224 of FIG. 2), or between two WSSes at different COs. The control node contains a controller and a discovery unit (DiU). In one embodiment, the controller and the DiU are separate network devices coupled with each other. In another embodiment, the controller and the DiU are integrated into one network device.

At block 402, the controller selects an unassigned wavelength between the pair of wavelength switching devices. Because in a WDM network, wavelength assignment at the wavelength switching devices are assuming known (through checking bandwidth planning data or discovery through OAM channel for example), the controller can find the unassigned wavelength between the pair of wavelength switching devices.

At block 404, the controller selects a port of a first wavelength switching device of the pair of the wavelength switching devices. The controller may select the wavelength switching device or the port using various criteria. For example, the controller may select a wavelength switching device with the highest or lowest identifier. The controller may select a port with the highest or lowest port number. The wavelength switching device is coupled to a hub, and the coupling port of the wavelength switching device is not selected. When the wavelength switching device is a WSS, the selected port is a tributary port, and the coupling port is a common port connecting to a hub—the connectivity of the common port is known thus no topology discovery is required.

Once the port is selected, at block 406, the controller configures a pass through state between the selected port and a coupling port connecting to the hub. Then at block 408, the DiU sends a probing signal (referred to as the first probing signal to differentiate with another probing signal for OADM topology discovery) at the unassigned wavelength to the first wavelength switching device.

At block 410, the DiU detects the first probing signal at the unassigned wavelength through a selected port of the second wavelength switching device of the wavelength switching device pair during a time period. The selected port of the second wavelength switching device and a coupling port of the wavelength switching device are configured to be in a pass through state. The time period is set to be the maximum round trip time. If during the time period, the signal is detected, the controller records a connection between the port of the first wavelength switching device and the selected port of the second wavelength switching device.

At block 414, the controller checks and see if all the ports of the second wavelength switching device excluding the coupling port (which connects to a hub) have been selected, if not, the controller goes to block 416 and iteratively select another port of the second wavelength switching device, and repeat the steps 410-414 until all the ports of the second wavelength switching device excluding the coupling port have been selected for probing signal detection.

Once all detection of steps 410-414 is complete, the flow goes to block 418, and the controller determines if all the ports of the first wavelength switching device excluding its coupling port have been selected for wavelength switching device port discovery. If all the ports are selected, the process ends and connectivity of all ports between the two wavelength switching devices are detected. If not, the flow goes to block 420 and the controller iteratively select a port of the first wavelength switching device, and repeat steps 406-418 until all the ports of the first wavelength switching device excluding its coupling port are processed through. With the iteratively methods, the controller determines port connectivity between the two wavelength switching devices.

While method 400 scan through all ports excluding coupling ports at both the first and the second wavelength switching devices, in one embodiment of the invention, the probing signal may only send to a subset of ports that have unknown connectivity with another wavelength switching device. In other words, blocks 414 and 418 determine not whether all ports of the first or second wavelength switching devices are selected, but rather, select sets of ports on the first and second wavelength switching devices. In one embodiment, the DiU is one of a plurality of DiUs, in which case, a unique ID can be assigned to a probing signal from a particular DiU.

Embodiment of OADM Topology Discovery

Once the port connectivity between wavelength switching devices is established, the next step in topology is to discover and verify the OADMs installed on fiber rings coupled to the wavelength switching devices of a WDM network. The discovery may be performed at system installation in one embodiment. Before each OADM is checked out from inventory, the add and drop ports for the same wavelength are connected using a patch cord as factory installed. This preconfiguration of OADMs will loop back the wavelength for this OADM, and "stamps" the wavelength with the typical 3 dB signal loss by the OADM splitter, compared with the wavelengths that go through the band pass filter of OADM with a lower loss (typically around 1 dB). By detecting signals looped back from OADM and determining the power level of a received signal, the presence of OADM can be confirmed. In addition, it would be possible to employ the metric of power attenuation for decoding additional location information. When bidirectional OADMs are to be installed, a perfect reflector connector (typically a metal plated ferrule) at the port could be installed. This can be done as factory installation, and is removed when the OADM port is connected to an optical SFP port.

Figure 5:
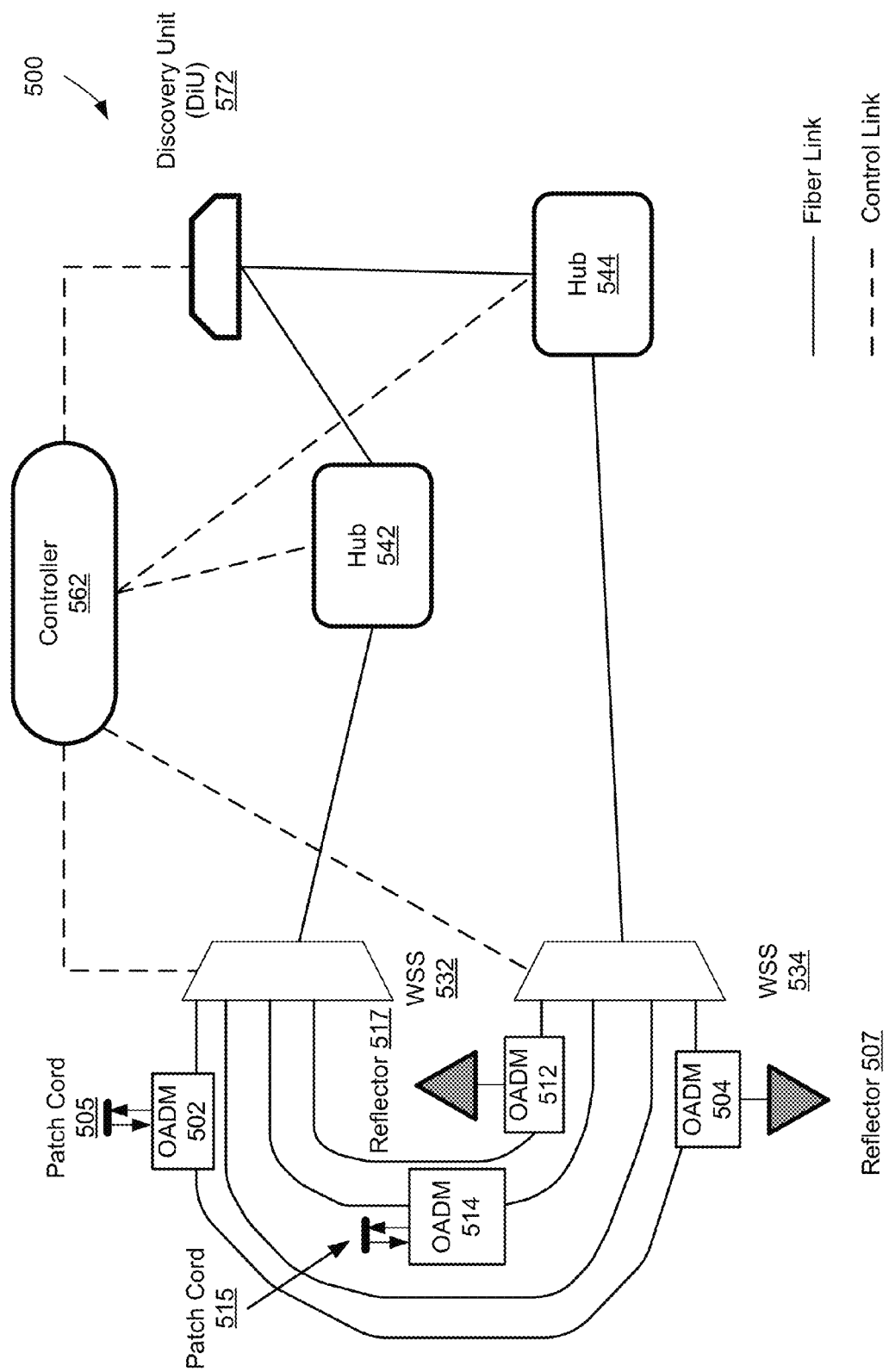
FIG. 5 illustrates OADM topology discovery according to one embodiment of the invention.

FIG. 5 illustrates OADM topology discovery according to one embodiment of the invention. FIG. 5 is similar to FIG. 3, and same and similar references indicate elements or components having the same or similar functionalities. Note, unlike FIG. 3, where control node 352 contains components controller 362 and DiU 372 for topology discovery, in FIG. 5, controller 552 and DiU 572 are separate network devices coupled to each other. The configuration of FIG. 3 can be used for OADM topology discovery, and the configuration of FIG. 5 can also be used for WSS topology discovery. As discussed herein above, while WSSes are illustrated in FIGS. 3 and 5 as examples of wavelength switching devices, embodiments of the invention apply to other wavelength switching devices, and OADMs may be coupled to wavelength switching devices other than WSSes and still utilize embodiments of the invention.

Referring to FIG. 5, each OADM port not connected to the fiber rings are connected either through patch cord such as patch cords 505 and 515, or through reflectors 507 and 517. At the time of OADM topology discovery, the WSS topology (i.e., an example of topology of wavelength switching devices) has been determined, through the method illustrated in FIG. 4 or otherwise. For each pair of ports of wavelength switching devices (e.g., WSS ports) that an OADM connecting to, the power level of the pair of ports in a pass through state is known, through the method illustrated in FIG. 4 or otherwise. Thus one may configure the ports of wavelength switching devices associated with the particular OADM at pass through state and measuring the power level passing through the OADM. If a power drop is noticeable (say around 3 dB), then one may determine that the OADM is correctly connected to the ports of the wavelength switching devices as the power drop is considered being caused by the working OADM filter.

Using OADM 514 for an example, it is known that the received power level without OADM 514 and going through ports of WSSes 532 and 534 at an unassigned wavelength is $P_x^{p,q}$ for port pairs of (p, q). Controller 562 configures the two WSSes 532 and 534 in a pass through state for a planned wavelength (e.g., $w_y$) between the two WSSes and the OADM 514. DiU 572 then sends out a probing signal at wavelength $w_y$. DiU 572 then detects the received probing signal at wavelength $w_y$ at Hub 544. If the power level of the received probing signal is substantially equal to the recorded $P_x^{p,q}$ (e.g., within 1 dB), controller 562 determines that OADM 514 is not configured or working improperly. If DiU 572 cannot detect the received probing signal at wavelength $w_y$ at Hub 544 after a time period (e.g., maximum round trip time for the probing signal), controller 562 determines that OADM 514 is not powered up or configured improperly. On the other hand, if the probing signal is detected, and the recorded $P_x^{p,q}$ is higher than the power level of the received probing signal over a threshold level (e.g., 3 dB for one OADM), then controller 562 determines that OAM 514 is provisioned and working properly between the assigned ports of WSSes 532 and 534. The process may continue for all WSSes ports where OADMs are planned to be connected.

Through DiU 572, controller 512 confirms correct installation and wavelength configurations of OADMs, and it can send a verification message to the installation technician (for example, by short message service (SMS) message or mobile application), which indicates that an installed OADM is the correct one at a particular site.

Figure 6:
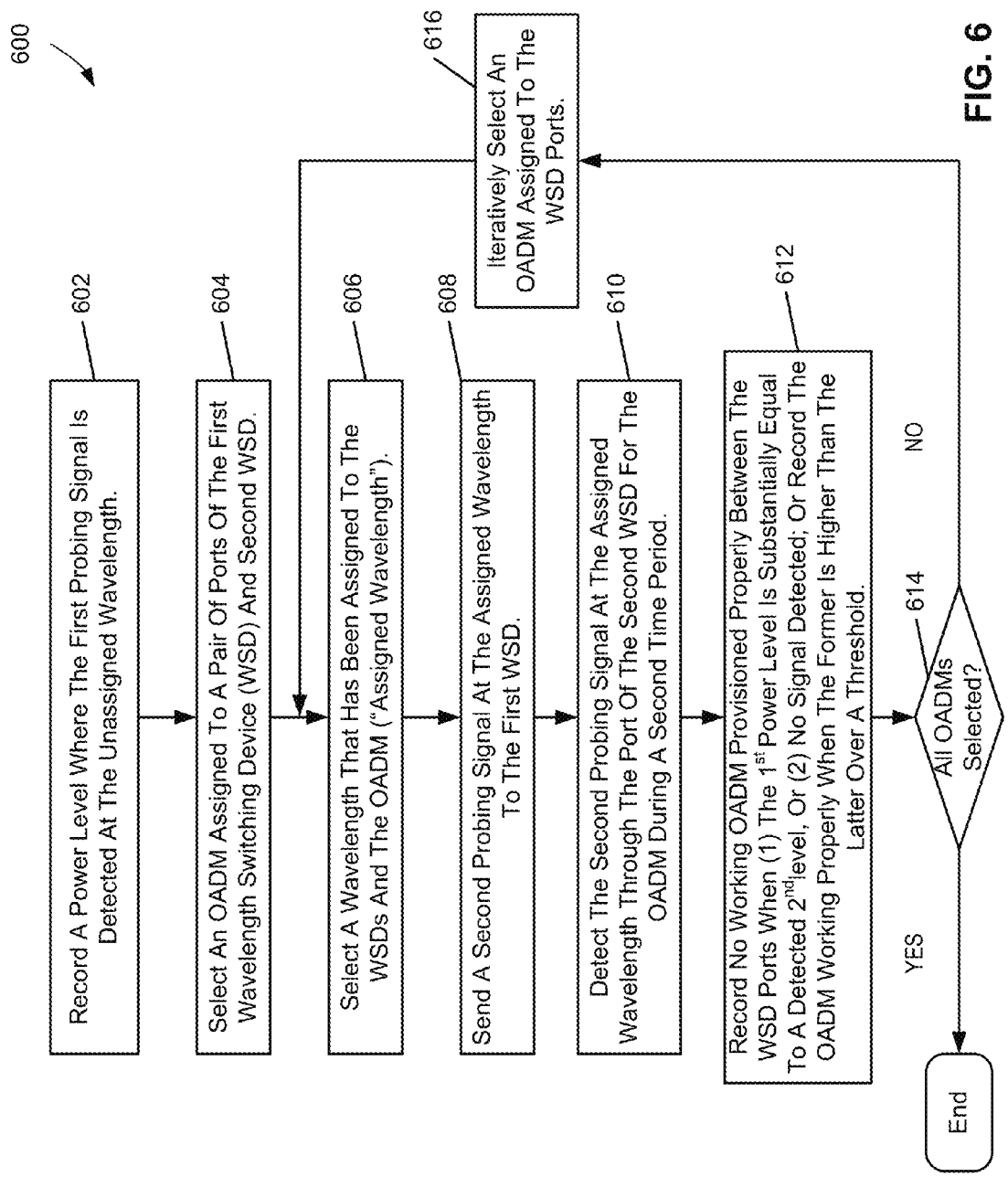
FIG. 6 is a flow diagram illustrating OADM topology discovery according to one embodiment of the invention.

FIG. 6 is a flow diagram illustrating OADM topology discovery according to one embodiment of the invention. Method 600 can be implemented at a controller and a discovery unit of a WDM network, or it can be implemented at a control node including controller function and discovery unit function. Method 600 is used to determine OADM status of a WDM network, and each OADM is planned to be coupled with a pair of ports of wavelength switching devices.

Method 600 starts with the understanding that the power level of a probing signal sending through the pair of ports of wavelength switching devices on an unassigned wavelength is known. The power level is recorded and it may be obtained through method 400 illustrated in FIG. 4. The method starts at block 602 with recording the power level (referring to as the "first" power level) of the probing signal at an unassigned wavelength between the pair of ports assigned to one or more OADM by the controller. Then one of the OADM is selected at block 604 to determine if it is provisioned and work properly between the pair of ports.

At block 606, the controller selects a wavelength that has been assigned to the wavelength switching devices and the OADM. Note that if method 600 is implemented along with method 400, the ports are configured in a pass through state already. If method 600 is implemented independently, the pair of ports need to be configured in pass through state to their respective coupling ports. Also, each port of the OADM is coupled to either a patch cord or a reflector. Then the DiU sends a probing signal (the "second" probing signal to differentiate the first probing signal used for the wavelength switching device topology discovery) to the first the wavelength switching device at block 608.

At block 610, the DiU detects the second probing signal at the assigned wavelength through the port of the second the wavelength switching device for the OADM during a time period (the "second" time period to differentiate the first time period used for the wavelength switching device topology discovery). The time period is the maximum round trip time through the OADM.

Then at block 612, if the detected power level is substantially equal to the first power level (e.g., within one or two dB) or no probing signal is detected within the time period, the controller records no working OADM being provisioned properly between the pair of ports of the wavelength switching devices. In one embodiment, different indications are associated with detected power level being substantially equal to the first power level and no probing signal being detected within the time period. If the probing signal is detected within the time period, and the first power level is higher than the detected power level over a threshold, the controller records that the OADM is provisioned and working properly between the pair of ports.

At block 614, the controller determines if all the OADM between the pair of ports are selected for the process, if not, another OADM is selected to the pair of ports at block 616, and the steps 606-614 are repeated. If all the OADMs are selected for the process, method 600 ends.

Note, method 600 may also send notification of the OADM detection/topology discovery results to a management interface, which informs technician/craft person during installation, troubleshooting, or maintenance activities. Also, multiple DiU may be utilized for sending and detecting probing signal to speed up the OADM detection/topology discovery process, in which case unique ID for each probing signal is needed.

Network Devices Implementing Method of Automatic Topology Discovery

Figure 7:
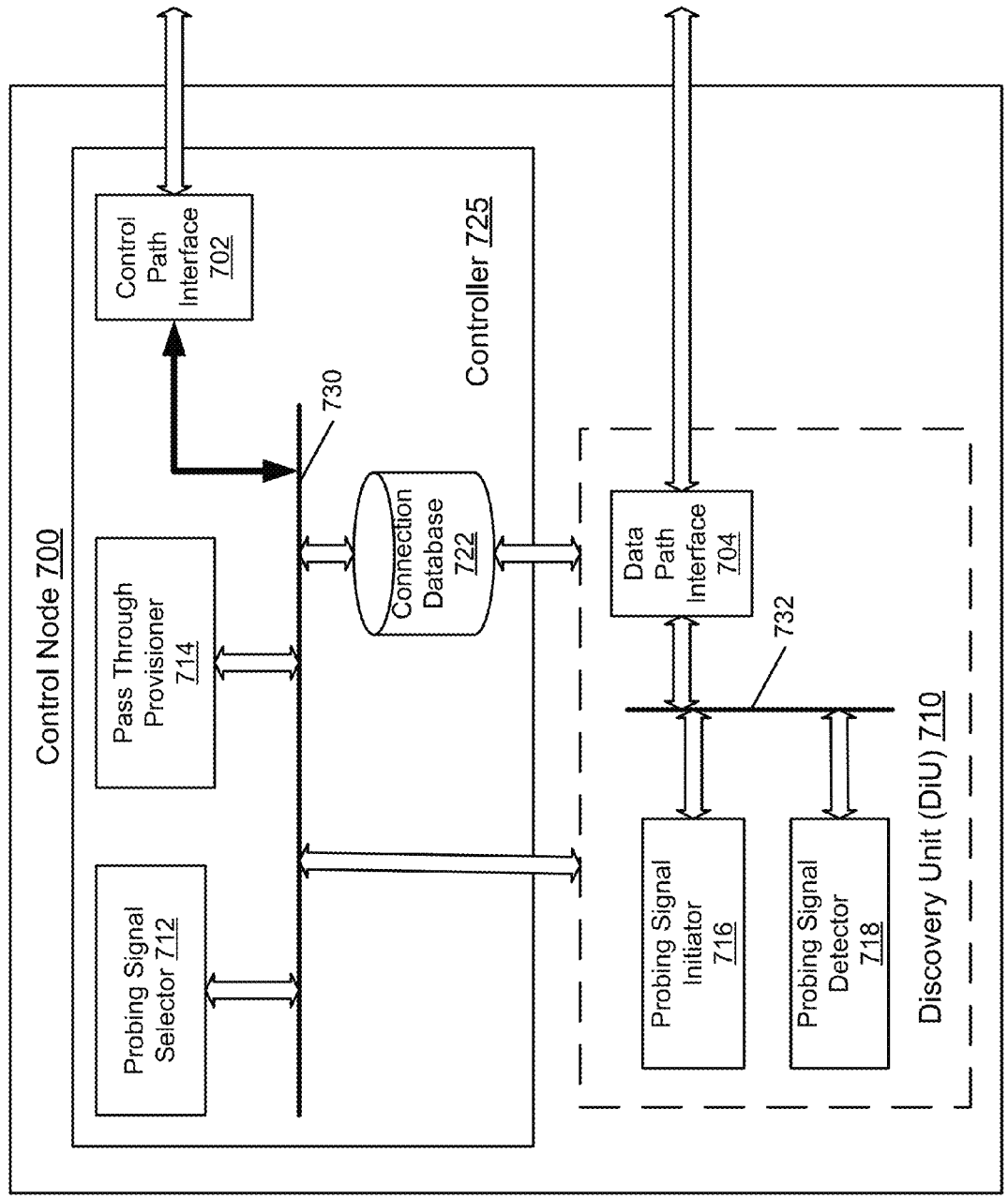
FIG. 7 is a flow diagram illustrating the process of allocating bandwidth based on task deadline according to one embodiment of the invention.

FIG. 7 is a block diagram illustrating a network device implementing a method of automatic topology discovery according to one embodiment of the invention. Control node 700 performs control and management function in a WDM network. In one embodiment, control node 700 contains discovery unit (DiU) 710. In another embodiment, DiU 710 is a separate entity coupled to control node 700.

Control node 700 contains a control path interface 702 configured to configure ports of WSSes, for example, configure a pass through state between ports based on request initiated from pass through provisioner 714. Control node 700 also contains probing signal selector 712, which is configured to select a probing signal. For port connectivity detection of wavelength switching devices, an unassigned wavelength is used to for the probing signal, and for OADM detection, an assigned wavelength is used for the probing signal. Control path interface 702, pass through provisioner 714, probing signal selector 712, and discovery unit (DiU) 710 are coupled via interconnect 730 in one embodiment.

DiU 710 contains data path interface 704, probing signal initiator 716 and probing signal detector 718, which are coupled through interconnect 732 in one embodiment. The generating and detecting of probing signals are performed via data path interface 704, where optical signal is transmitted and received at control node 700.

Control node 700 also contains connection database 722, which records the port connection of wavelength switching devices and OADM detection records. Connection database 722 may be coupled to a management interface to inform a management system or a craft person of the topology discovery results.

In one embodiment, control path interface 702, probing signal selector 712, pass through provisioner 714, and connection database 722 form controller 725. Controller 725 performs functions similar to that of controller 562 illustrated in FIG. 5.

In one embodiment, control node 700 starts port discovery connectivity between a pair of the wavelength switching devices by probing signal selector selecting an unassigned wavelength between the pair of the wavelength switching devices. For a select port of a first the wavelength switching device of the pair of the wavelength switching devices, pass through provisioner 714 initiates configuring a pass through state between the selected port and a coupling port of the first the wavelength switching device (e.g., the common port of a WSS) through control interface 702, where the coupling port coupled to the control node.

The probing signal initiator 716 of DiU 710 send a first probing signal at the unassigned wavelength to the first wavelength switching device through data path interface 704. Probing signal detector 718 initiates iteratively detecting the first probing signal at the unassigned wavelength through each of a set of ports of the second wavelength switching device of the pair of wavelength switching device s during a time period, where a pass through state is configured iteratively between each port of the set of ports of the second wavelength switching device and a coupling port of the second wavelength switching device. When the first probing signal is detected at the unassigned wavelength through a port of the second wavelength switching device, connection database 722 records a connection between the first port of the first wavelength switching device and the port of the second wavelength switching device.

In one embodiment, control node 700 may further perform OADM detection for topology discovery. Connection database 722 is configured to record power level (a first power level) for each port pair of the first wavelength switching device and the second wavelength switching device at an unassigned wavelength. For each OADM of a set of OADMs assigned to the first wavelength switching device and the second wavelength switching device, the probing signal selector is further configured to select a wavelength that has been assigned to the pair of wavelength switching devices and the OADM ("assigned wavelength"), where each port of each OADM is coupled to either a patch cord or a reflector, and where the probing signal initiator is further configured to initiate sending a second probing signal at the assigned wavelength to the first wavelength switching device. Probing signal detector 718 then initiates detecting the second probing signal at the assigned wavelength through the port of the second wavelength switching device for the OADM during a second time period. If the detected second probing signal having a second power level substantially equal to the first power level, or the second probing signal not being detected during the second time period, connection database 722 records no working OADM provisioned properly between the pair of ports of the first wavelength switching device and the second wavelength switching device. Otherwise if the first power level being higher than the detected second probing signal over a threshold, connection database 722 records the OADM is provisioned and working properly upon the first power level being higher than the detected second probing signal over a threshold.

Note the operations of the flow diagrams in FIGS. 4 and 6 are described with reference to the exemplary embodiment of FIG. 7. However, it should be understood that the operations of flow diagrams can be performed by embodiments of the invention other than those discussed with reference to FIG. 7, and the embodiments discussed with reference to FIG. 7 can perform operations different than those discussed with reference to the flow diagrams of FIGS. 4 and 6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device, or a cloud centralized management system at a data center). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for automatic topology discovery implemented in a wavelength division multiplexing (WDM) network, wherein the WDM network contains a plurality of wavelength switching devices, the method comprising:
    selecting an unassigned wavelength between a pair of wavelength switching devices of the plurality of wavelength switching devices;
    for a first port of a first wavelength switching device of the pair of wavelength switching devices,
        configuring a pass through state between the first port and a coupling port of the first wavelength switching device, wherein the coupling port coupled to a control node aggregating traffic of the first wavelength switching device;
        sending a first probing signal at the unassigned wavelength to the first wavelength switching device;
        detecting iteratively the first probing signal at the unassigned wavelength through each of a set of ports of a second wavelength switching device of the pair of wavelength switching devices during a first time period, wherein a pass through state is configured iteratively between each port of the set of ports of the second wavelength switching device and a coupling port of the second wavelength switching device; and
        recording a connection between the first port of the first wavelength switching device and a port of the second wavelength switching device when the first probing signal is detected at the unassigned wavelength at the port of the second wavelength switching device.

2. The method of claim 1, wherein each of the pair of wavelength switching devices is assigned to couple to one or more optical add drop modules (OADMs).

3. The method of claim 2, further comprising:
    recording a first power level where the first probing signal is detected at the unassigned wavelength;
    for each OADM of a set of OADMs assigned to the first wavelength switching device and the second wavelength switching device,
        selecting a wavelength that has been assigned to the wavelength switching devices and the OADM ("assigned wavelength"), wherein each port of the OADM is coupled to either a patch cord or a reflector;
        sending a second probing signal at the assigned wavelength to the first wavelength switching device;
        detecting the second probing signal at the assigned wavelength through the port of the second wavelength switching device for the OADM during a second time period; and
        recording no working OADM provisioned properly between the ports of the first wavelength switching device and the second wavelength switching device upon the detected second probing signal having a second power level substantially equal to the first power level, or the second probing signal is not detected during the second time period.

4. The method of claim 3, further comprising:
    recording the OADM is provisioned and working properly between the ports of the first wavelength switching device and the second wavelength switching device upon the first power level being higher than the detected second probing signal over a threshold.

5. The method of claim 1, wherein the first probing signal is sent by a discovery unit (DiU).

6. The method of claim 5, wherein the DiU is one of a plurality of DiUs.

7. The method of claim 1, wherein configuring the pass through state is performed by a controller apart from the first wavelength switching device.

8. The method of claim 1, wherein the first probing signal is assigned with a unique identifier (ID) within the WDM network.

9. The method of claim 1, wherein the wavelength switching devices are wavelength selective switches (WSSes).

10. The method of claim 1, wherein the set of ports of the second wavelength switching device includes all ports of the second wavelength switching device excluding ports coupled to the control node.

11. A network device configured as a control node for automatic topology discovery of a wavelength division multiplexing (WDM) network, wherein the WDM network contains a plurality of wavelength switching devices, the network device comprising:
    a controller, including:
        a control path interface configured to configure ports of the plurality of wavelength switching devices;
        a connection database configured to record connections based on a recording request;
        a probing signal selector configured to select an unassigned wavelength between a pair of wavelength switching devices of the plurality of wavelength switching devices; and
        a pass through provisioner configured to, for a first port of a first wavelength switching device of the pair of wavelength switching devices, initiate configuring a pass through state between the first port and a coupling port of the first wavelength switching device, wherein the coupling port coupled to a control node aggregating traffic of the first wavelength switching device; and
    a discovery unit (DiU) coupled to the WDM controller, the discovery unit including:
        a data path interface configured to send and detect probing signals as requested;
        a probing signal initiator configured to initiate sending a first probing signal at the unassigned wavelength to the first wavelength switching device; and
        a probing signal detector configured to initiate iteratively detecting the first probing signal at the unassigned wavelength through each of a set of ports of a second wavelength switching device of the pair of wavelength switching devices during a first time period, wherein a pass through state is configured iteratively between each port of the set of ports of the second wavelength switching device and a coupling port of the second wavelength switching device, and send out the recording request to record a connection between the first port of the first wavelength switching device and a port of the second wavelength switching device when the first probing signal is detected at the unassigned wavelength through the port of the second wavelength switching device.

12. The network device of claim 11, wherein each of the pair of wavelength switching devices is assigned to couple to one or more optical add drop modules (OADMs).

13. The network device of claim 12,
wherein the connection database is further configured to record a first power level where the first probing signal is detected at the unassigned wavelength,
wherein for each OADM of a set of OADMs assigned to the first wavelength switching device and the second wavelength switching device,
the probing signal selector is further configured to select a wavelength that has been assigned to the WSSes and the OADM ("assigned wavelength"), wherein each port of each OADM is coupled to either a patch cord or a reflector,
the probing signal initiator is further configured to initiate sending a second probing signal at the assigned wavelength to the first wavelength switching device,
the probing signal detector is further configured to initiate detecting the second probing signal at the assigned wavelength through the port of the second wavelength switching device for the OADM during a second time period, and
wherein the connection database is further configured to record no working OADM provisioned properly between the ports of the first wavelength switching device and the second wavelength switching device upon the detected second probing signal having a second power level substantially equal to the first power level, or the second probing signal not being detected during the second time period.

14. The network device of claim 13, wherein the connection database is further configured to record the OADM is provisioned and working properly upon the first power level being higher than the detected second probing signal over a threshold.

15. The network device of claim 11, wherein the WDM controller further includes a hub, through which the first probing signal is sent to the first wavelength switching device.

16. The network device of claim 11, comprising one or more additional DiUs.

17. The network device of claim 11, wherein the first probing signal is assigned with a unique identifier (ID) within the WDM network.

18. The network device of claim 11, wherein the pair of wavelength switching devices protect each other.

19. The network device of claim 11, wherein the wavelength switching devices are wavelength selective switches (WSSes).

20. The network device of claim 11, wherein set of ports of the second WSS includes all ports of the second WSS excluding ports coupled to the control node.

21. A method for automatic topology discovery implemented in a wavelength division multiplexing (WDM) network, wherein the WDM network contains a plurality of wavelength switching devices, the method comprising:
selecting an unassigned wavelength between a pair of wavelength switching devices of the plurality of wavelength switching devices, wherein each of the pair of wavelength switching devices is assigned to one or more optical add drop modules (OADMs) through dedicated ports of the wavelength switching devices;
for a first port of a first wavelength switching device of the pair of wavelength switching devices,
configuring a pass through state between the first port and a coupling port of the first wavelength switching device, wherein the coupling port coupled to a control node aggregating traffic of the first wavelength switching device;
sending a first probing signal at the unassigned wavelength to the first wavelength switching device;
detecting iteratively the first probing signal at the unassigned wavelength through each of a set of ports of a second wavelength switching device of the pair of wavelength switching devices during a first time period, wherein a pass through state is configured iteratively between each port of the set of ports of the second wavelength switching device and a coupling port of the second wavelength switching device;
recording a connection between the first port of the first wavelength switching device and a port of the second wavelength switching device when the first probing signal is detected at the unassigned wavelength at the port of the second wavelength switching device;
recording a first power level where the first probing signal is detected at the unassigned wavelength; and
for each OADM of a set of OADMs assigned to the first wavelength switching device,
selecting a wavelength that has been assigned to the wavelength switching devices and the OADM ("assigned wavelength"), wherein each port of each OADM is coupled to either a patch cord or a reflector;
sending a second probing signal at the assigned wavelength to the first wavelength switching device;
detecting the second probing signal at the assigned wavelength through the port of the second wavelength switching device for the OADM during a second time period; and
recording no working OADM provisioned properly between the ports of the first wavelength switching device and the second wavelength switching device upon the detected second probing signal having a second power level substantially equal to the first power level, or the second probing signal is not detected during the second time period.

22. A control node of a wavelength division multiplexing (WDM) network, wherein the WDM network contains a plurality of wavelength switching devices, the control node comprising:
a control path interface configured to configure ports of the plurality of wavelength switching devices;
a connection database configured to record connections between ports based on a recording request;
a probing signal selector configured to select an unassigned wavelength between a pair of wavelength switching devices of the plurality of wavelength switching devices;
a pass through provisioner configured to, for a first port of a first wavelength switching device of the pair of wavelength switching devices, initiate configuring a pass through state between the first port and a coupling port of the first wavelength switching device, wherein the coupling port coupled to the control node aggregating traffic of the first wavelength switching device; and a discovery unit including:
- a data path interface configured to send and detect probing signals as requested;
- a probing signal initiator configured to initiate sending a first probing signal through the data path interface at the unassigned wavelength to the first wavelength switching device; and
- a probing signal detector configured to initiate iteratively detecting the first probing signal at the unassigned wavelength through each of a set of ports of a second wavelength switching device of the pair of wavelength switching devices during a first time period, wherein a pass through state is configured iteratively between each port of the set of ports of the second wavelength switching device and a coupling port of the second wavelength switching device, and send out the recording request to record a connection between the first port of the first wavelength switching device and a port of the second wavelength switching device when the first probing signal is detected at the unassigned wavelength through the port of the second wavelength switching device.

* * * * *